Aug. 7, 1945.   G. C. GARRAWAY   2,380,962
PHOTOGRAPHIC PRINTING MACHINE
Filed Aug. 7, 1943   9 Sheets-Sheet 2

Inventor
George C. Garraway

Aug. 7, 1945.  G. C. GARRAWAY  2,380,962
PHOTOGRAPHIC PRINTING MACHINE
Filed Aug. 7, 1943  9 Sheets-Sheet 4

Inventor
George C. Garraway
By Francis H. Vanderwerken and Joseph H. Crow
Attorneys Aug. 7, 1945. G. C. GARRAWAY 2,380,962
PHOTOGRAPHIC PRINTING MACHINE
Filed Aug. 7, 1943 9 Sheets-Sheet 6

Inventor
George C. Garraway

Aug. 7, 1945.　　　G. C. GARRAWAY　　　2,380,962
PHOTOGRAPHIC PRINTING MACHINE
Filed Aug. 7, 1943　　　9 Sheets-Sheet 7
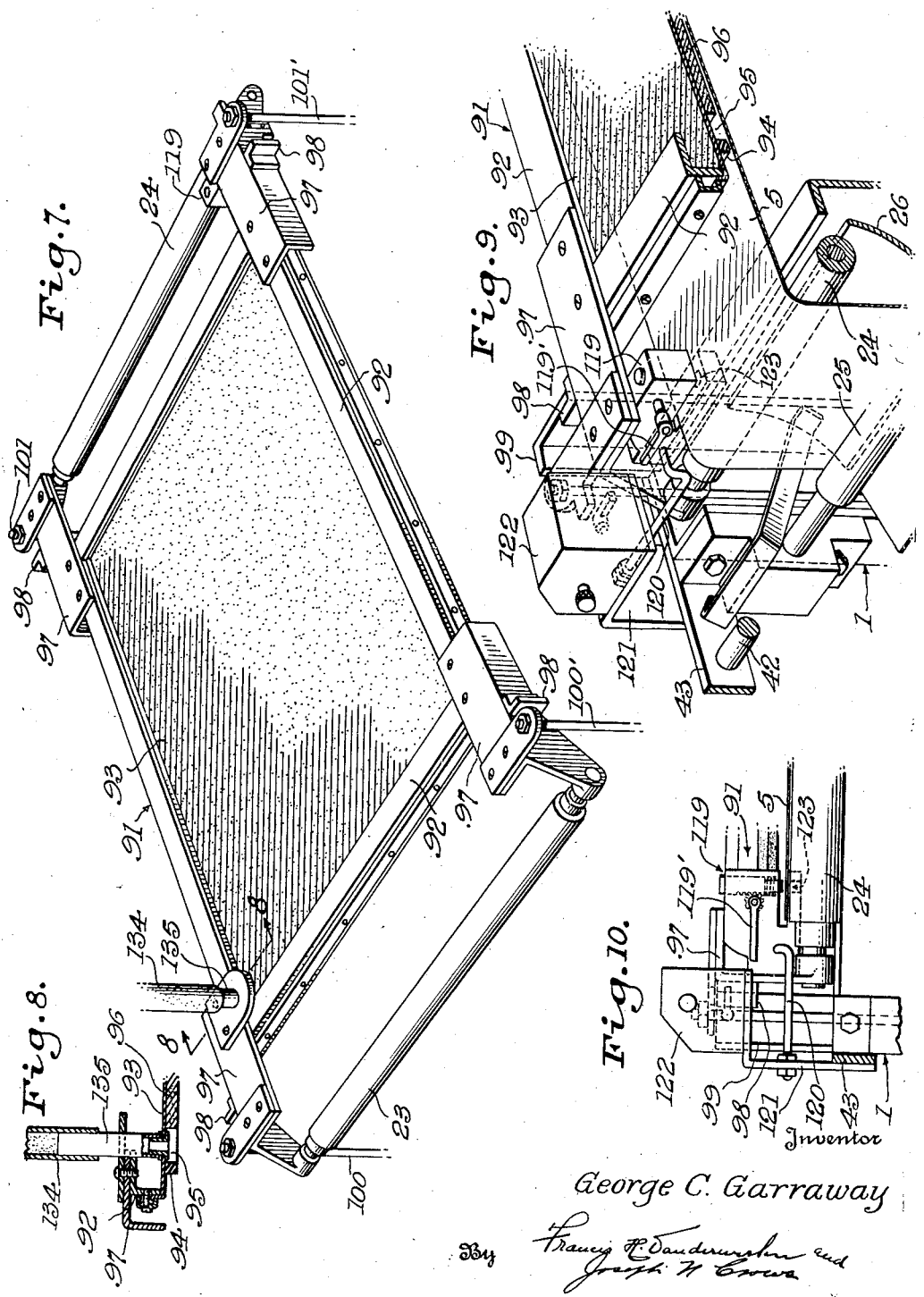
Inventor
George C. Garraway
By
Attorneys Aug. 7, 1945.　　　G. C. GARRAWAY　　　2,380,962
PHOTOGRAPHIC PRINTING MACHINE
Filed Aug. 7, 1943　　　9 Sheets-Sheet 8
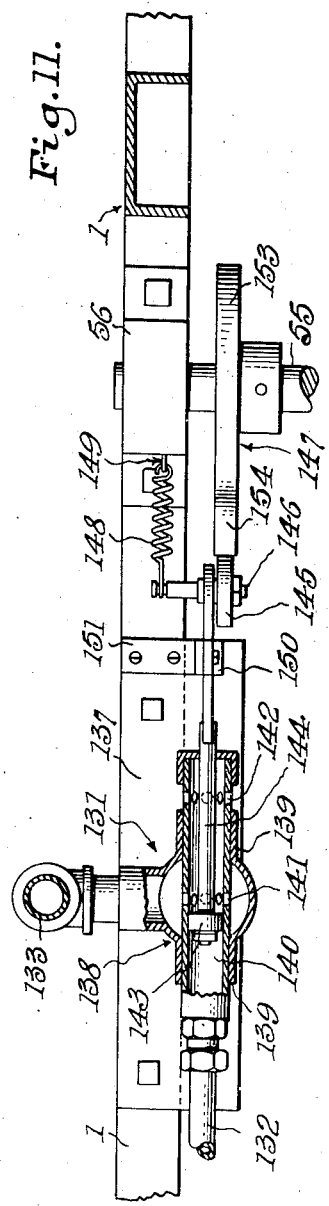
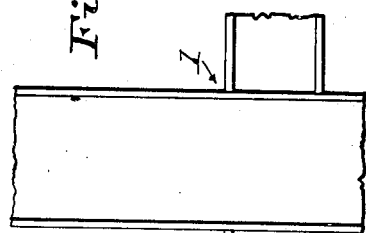
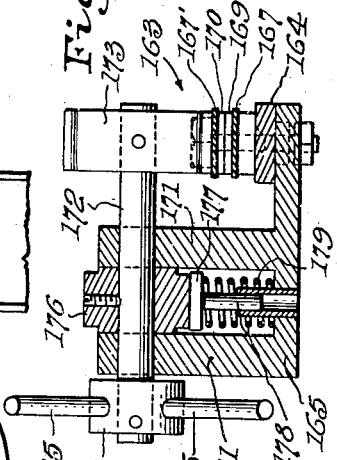
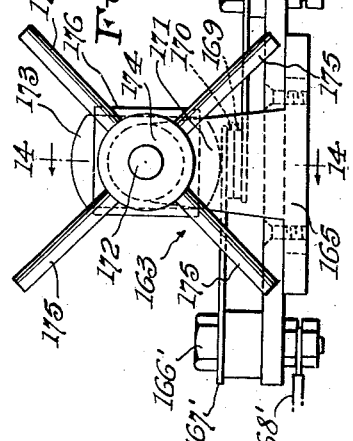
Inventor
George C. Garraway
By
Attorneys

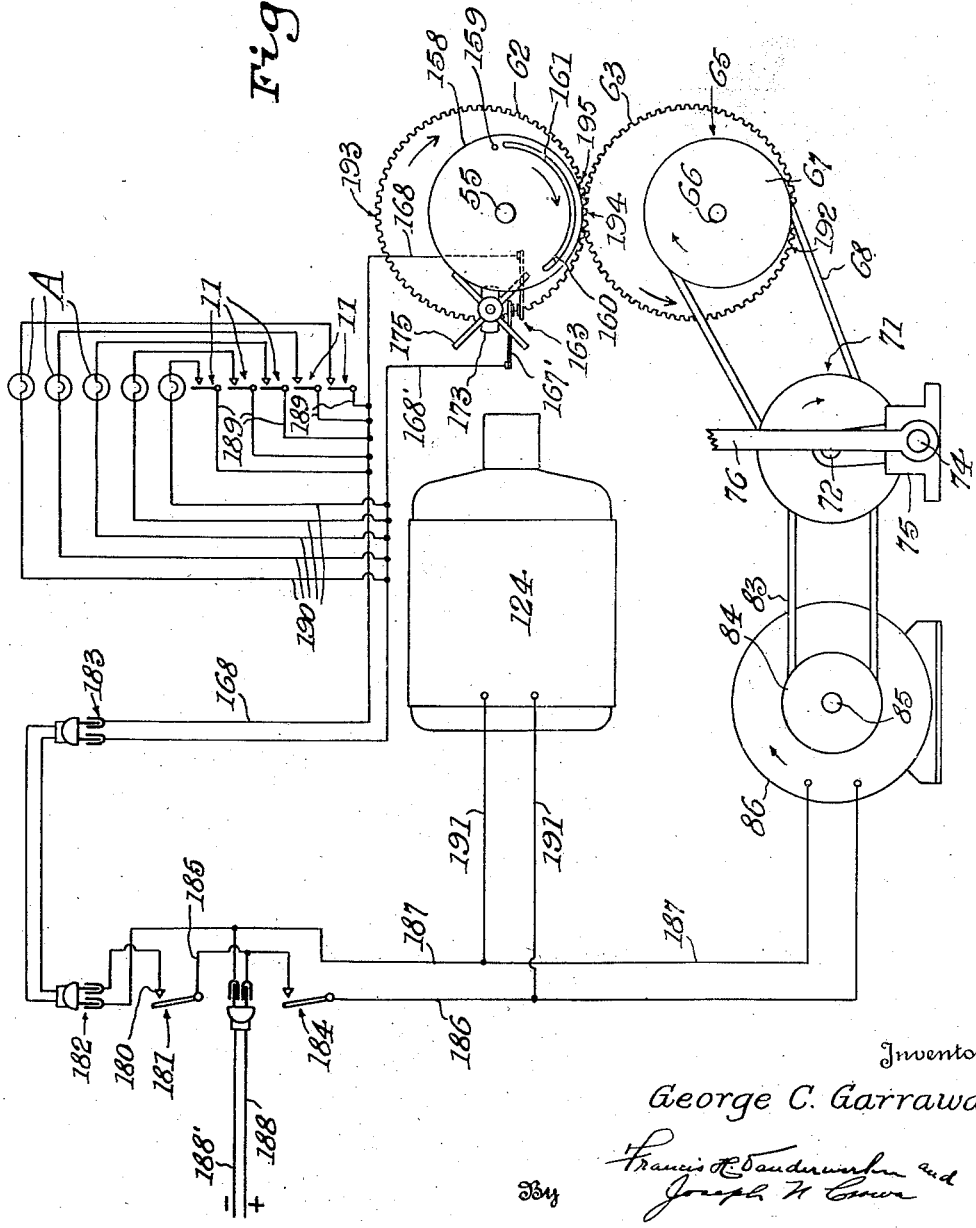

Patented Aug. 7, 1945

2,380,962

UNITED STATES PATENT OFFICE 2,380,962

PHOTOGRAPHIC PRINTING MACHINE

George C. Garraway, Rutherford, N. J.

Application August 7, 1943, Serial No. 497,751

7 Claims. (Cl. 95—76)

(Granted under the act of March 3, 1883, as amended April 30, 1928; 370 O. G. 757)

The invention described herein may be manufactured and used by or for the Government for governmental purposes, without payment to me of any royalty thereon.

This invention relates to photography and more particularly to a photographic printing machine for making photographic prints of a negative on a strip of sensitized material by exposing the sensitized material to light transmitted through the negative.

One of the objects of the invention is to provide a photographic printing machine adapted to automatically produce photographic prints of a negative in succession on a strip of sensitized material and to move the strip of sensitized material a selected distance after each printing operation so that successive prints are spaced at regular intervals on the sensitized material.

Another object of the invention is to provide a photographic printing machine including means adapted to automatically place portions of a strip of sensitized material in succession in contact with a photographic negative, to expose the portions of the strip of sensitized material to light through the negative for a predetermined period of time to produce photographic prints of the negative on the strip of sensitized material, to release the sensitized material from contact with the negative and to intermittently move the strip of sensitized material for a predetermined distance after each exposure of the strip of sensitized material to the negative.

Another object of the invention is to provide a photographic printing machine adapted to automatically produce photographic prints of a negative on a strip of sensitized material by exposing the strip of sensitized material to light transmitted through the negative and including means for varying the portion of each cycle of operation of the machine during the time which light is transmitted to the sensitized material through the negative, means for accelerating the speed of the machine during other portions of each cycle of operation thereof, and means adapted to rewind the exposed sensitized material for further processing.

Another object of the invention is to provide a photographic printing machine comprising a support, a platen including a transparent surface adapted to support a negative mounted on said support, a diaphragm carried by said platen, a transparent strip of sensitized material interposed between said platen and transparent surface, said platen mounted to be actuated upwardly and downwardly on the support at predetermined time intervals and adapted to press a portion of the strip of sensitized material into contact with the transparent surface having the negative thereon, means for evacuating the air from between the diaphragm and transparent surface for creating a vacuum therebetween, whereby atmospheric pressure is adapted to act on the diaphragm for pressing the strip of sensitized material into contact with the negative, means for exposing the strip of sensitized material to the negative by light passing through the transparent surface and negative whereby the negative is printed on the strip of sensitized material, means for controlling the period of exposure of the strip of sensitized material to the negative, means for releasing the vacuum from between the diaphragm and transparent surface, and means for moving the strip of sensitized material a predetermined distance after each exposure.

Heretofore photographic printing machines were operated at a low speed to allow sufficient time for portions of a strip of sensitized material to have contact with large negatives and sufficient printing time, thereby causing an unnecessary amount of time to be used for feeding the strip of sensitized material across the negative after each exposure, also to allow sufficient time in removing the sensitized material from the negative by a contact platen and moving the contact platen to place the sensitized material in contact with the negative.

It is therefore the aim and purpose of this invention to provide a photographic printing machine adapted to utilize the least portion of each cycle of operation of the machine for raising a platen to remove the sensitized material from the negative to move the sensitized material a predetermined distance across the negative and to lower the platen to place the sensitized material in contact with the negative and to utilize the greater portion of each cycle of operation of the machine for securing contact of the sensitized material with the negative and for exposing the sensitized material to the negative.

With the above and other objects and advantages in view, the invention consists of certain features of construction and operation of parts which will hereinafter be described and shown in the accompanying drawings, in which:

Fig. 7 is a perspective view of a vacuum platen used in carrying out the invention with certain of its connected parts broken away therefrom;

Fig. 8 is a detail sectional view taken on the line 8—8 of Fig. 7;

Fig. 9 is a fragmentary perspective view of a portion of the machine having a punching device mounted thereon used in carrying out the invention;

Fig. 10 is a detail elevation of the punching device;

Fig. 11 is a plan view partly in section of a vacuum valve and operating mechanism therefor used in carrying out the invention;

Fig. 12 is a side elevation thereof;

Fig. 13 is a side elevation of a switch used in carrying out the invention;

Fig. 14 is a sectional view taken on the line 14—14 of Fig. 13; and

Fig. 15 is a diagram of an electrical circuit and connected parts used in carrying out the invention.

Figure 1:
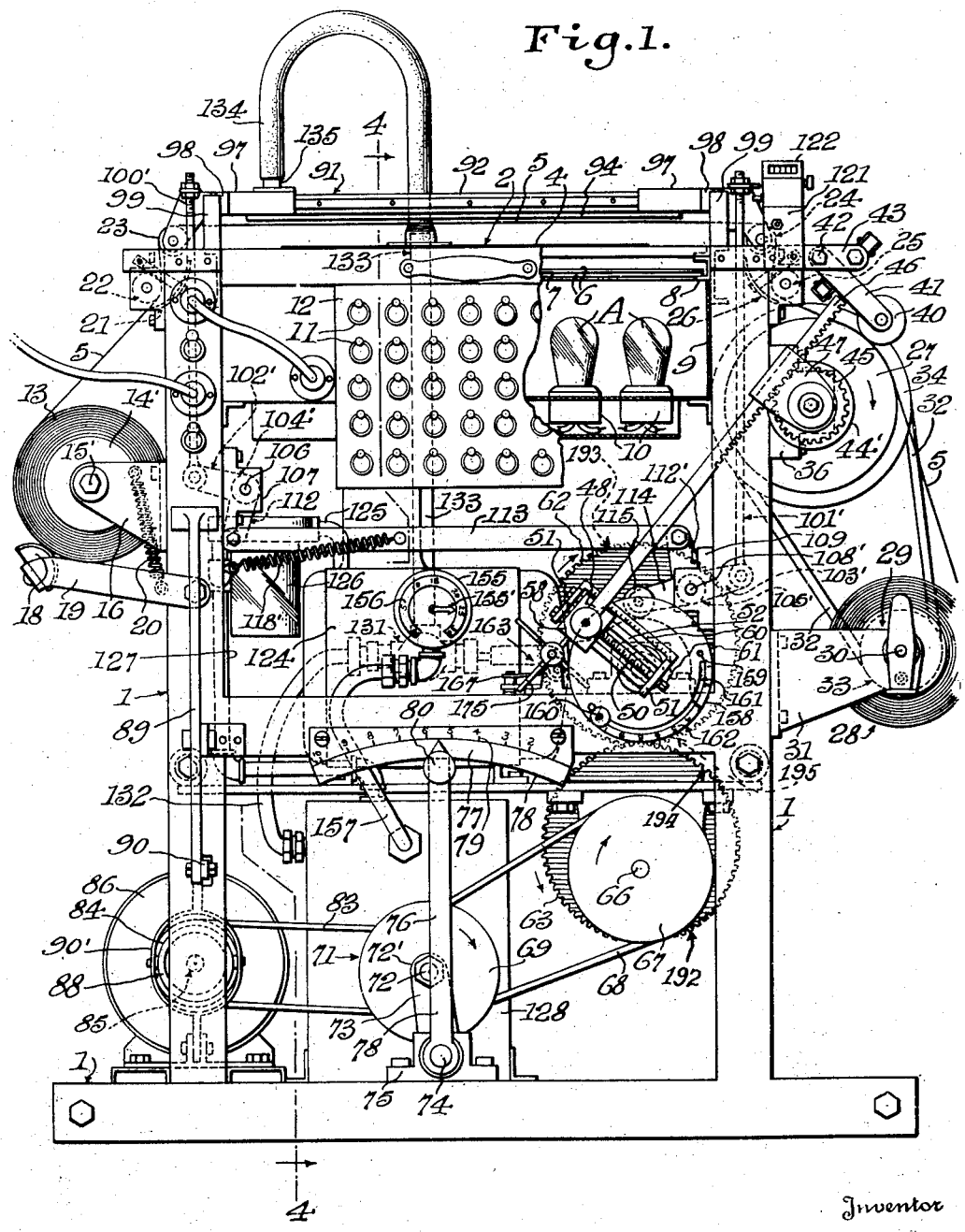
Fig. 1 is a side elevation of the improved photographic printing machine.

Referring more specifically to the drawings, a substantially rectangular upright frame 1 is provided having a negative carrier 2 slidably and removably mounted thereon adjacent to the upper end thereof. The negative carrier 2 is provided with a plate or panel 3 made of any suitable transparent material such as glass and having a negative 4 fixedly mounted on its upper surface, which negative 4 is adapted to be printed on the strip of sensitized material 5. Two plates of glass 6 or other suitable transparent material adapted to have any suitable light retarding material 7 sandwiched therebetween are removably mounted in guideways 8, said light retarding material 7 being adapted to compensate for uneven density in the negative 4. These glass plates 6 are arranged beneath the negative carrier plate 3 and beneath the glass plates 6 is a compartment or box 9 removably mounted on the machine frame 1. A bank of suitably spaced lamps A mounted in conventional electric sockets 10 is provided in the box 9 and the lamps A are individually controlled by means of any suitable type of electrical switches 11 mounted on a panel 12 of the switch box 9.

The strip 5 of sensitized material is taken from a roll 13 rotatably mounted on and removable from two supporting members 14 and 14' including shafts 15 and 15' rotatably mounted on brackets 16 mounted on the rear end of the machine frame 1. The shaft 15 of the supporting member 14 is also horizontally and adjustably mounted on its bracket 16, whereby a new roll of sensitized material may be substituted for a used roll, and the shaft 15 is held in a locked position on its bracket by means of any suitable locking device 17 such as illustrated in the copending application Serial No. 477,810, filed March 3, 1943. The roll 13 of sensitized material is engaged by a brake shoe 18 mounted on the outer ends of a pair of arms 19 pivotally mounted at their inner ends to the machine frame 1 and the brake shoe 18 is held in contact with the roll 13 of sensitized material by means of springs 20 connected to the arms 19 and brackets 16, whereby the required tension is placed on the roll 13 of sensitized material.

The strip 5 of sensitized material is fed from the roll 13 between a guide element 21 and a roller 22, then over a roller 23, which guide element 21 and roller 22 are suitably mounted on the rear end of the machine frame 1 adjacent to the upper portion thereof, and the strip of sensitized material is then fed horizontally across the glass panel 3 above the negative 4 to another roller 24. The rollers 23 and 24 are mounted on a platen 81 to be hereinafter described. The strip of sensitized material from the roller 24 is then fed between a roller 25 and a guide element 26, then over a feed roller 27 to a rewind roller member 28 supported on holding members 29 and 29' having shafts 30 and 30', respectively, provided thereon, which shafts 30 and 30' are rotatably mounted on brackets 31 mounted on the front end of the machine frame 1. The shaft 30 of the holding member 29 is also horizontally adjustable on its bracket 31 as is the shaft 15 for the roll 13 of sensitized material, whereby another rewind roller member may be substituted for the rewind roller member 28 after a predetermined amount of the strip 5 of exposed sensitized material has been rewound thereon. The rewind roller member 28 is rotated by means of a belt 32 connected with a small pulley 33 movably mounted on the outer end of the shaft 30' of the holding member 29' and connected with a large pulley 34 fixedly mounted on one end of the shaft 35 of the feed roller 27, which feed roller shaft 35 is rotatably mounted in bearings 36 on machine frame 1. The small pulley 33 is adapted to be moved into frictional contact with a flange 37 provided on shaft 30' of holding member 29', whereby the required tension of the strip 5 of sensitized material rewound on the roller member 28 may be regulated, the amount of frictional contact of pulley 33 with flange 37 being regulated by a spring 38 engaged by a hand wheel 39 adjustably mounted on the outer end of holding member shaft 30'.

In contact with the strip 5 of sensitized material on the feed roller 27 is a plurality of rollers 40, each separately supported on the lower ends of each of the arms 41, pivotally mounted at their upper ends to a rod 42 fixedly mounted on brackets 43 mounted on the machine frame. The rollers 40 are held in contact with the strip of sensitized material by means of springs 44, and raised out of contact therefrom by a hand operated lever 43'.

A conventional one-way or overrunning clutch 44' of any suitable type, such as illustrated in the copending application above referred to, is mounted on the opposite end of the feed roller shaft 35 from the end on which the large pulley 34 is mounted. A gear 45 is mounted on overrunning clutch 44', and meshes with the upper end of a rack 46, slidably mounted on a bracket 47 mounted on the feed roller shaft 35. The lower end 48 of the rack 46 is pivotally mounted on a crank pin 49 adjustably mounted on a threaded shaft 50, rotatably mounted on end plates 51 of parallel bars 52 of a crank 53 fixedly mounted on one end 54 of a main shaft 55 rotatably mounted in bearings 56 on the machine frame 1. The lower end of rack 46 is pivotally held on the outer end of the crank pin 49 by a nut 57 and a nut 58 is adjustably mounted on the parallel bars 52, which nut 58 carries an index 59 for a suitable graduate scale 60. One end of threaded shaft 50 has a tool-engaging portion 61 formed thereon which is adapted to be engaged by a wrench or other suitable device for rotating the shaft 50, whereby the crank pin 49 may be adjusted therealong, for adjusting the lower end of the rack 46 on the crank 53, with the index 59 indicating on the scale 60 the amount of adjustment of the lower end of the rack 46 on the crank 53 for a purpose which will hereinafter appear.

The main shaft 55 has a gear 62 eccentrically mounted thereon, which meshes with a gear 63 eccentrically mounted on an output shaft 64 of any suitable type of conventional speed-reduction device 65 suitably mounted on machine frame 1, with the input shaft 66 of the speed reduction device 65 having a pulley 67 fixedly mounted thereon, which pulley 67 is driven by a belt 68 engaging between two pulley elements 69 and 70 of a standard speed regulating device 71. The pulley elements 69 and 70 are mounted on a shaft 72 fixedly mounted at one end in a collar 72' on one end of an arm 73 having another collar 73' on its other end. The collar 73' is fixedly mounted on one end of a shaft 74 rotatably mounted in a bearing 75 mounted on the machine frame 1. A lever 76 is mounted at its lower end to the other end of shaft 74 and the upper end of the lever is adapted to be moved along a plate 77 mounted on the machine frame 1, said plate 77 having an arcuate shaped portion 78 with a scale 79 inscribed thereon, said scale 79 being suitably graduated for indicating the resulting speed of the machine at each position of the lever 76 along scale 79. The upper end of the lever 76 is pointed and held in an adjusted position along plate 77 by means of a locking screw 80 and nut 81.

The pulley element 70 is positioned between the pulley elements 69 and 82 of the standard speed regulating device 71 and is free to move longitudinally along shaft 72. The belt 68 engages between pulley element 69 and one side of pulley element 70, and a belt 83 engages between pulley element 82 and the other side of pulley element 70, with the belt 83 also engaging with a pulley 84 on the shaft 85 of any suitable type of electric motor 86. The pulley elements 69, 70 and 82 of the speed regulating device 71 are provided with teeth 87 for meshing with each other.

A conventional clutch 88 is mounted on motor shaft 85 and is adapted to be actuated by a lever 89 through links 90 and 90' for disconnecting pulley 84 from motor shaft 85, thus stopping the operation of the machine when desired, and also for connecting pulley 84 to the motor shaft to start the machine.

A vacuum contact platen 91 is arranged above the negative carrier 2 and is adapted to be automatically actuated for moving the portion of the strip 5 of sensitized material above the negative carrier into close contact with the transparent panel 3 having the negative 4 therebetween, said platen 91 comprising a substantially rectangularly shaped frame 92 having a diaphragm 93 made of rubber or other resilient material mounted on the lower edge of the frame, with strips 94 of soft rubber or other suitable material mounted around the outer edges of the diaphragm. The soft rubber strips 94 are so placed on the frame 92 that they will contact with the transparent panel 3, with the space 95 between the strips 94 and a pad 96 providing a passage, whereby air may pass freely therethrough for a purpose which will hereinafter appear. The pad 96 which is made of suitable porous material such as felt is mounted on the lower surface of the diaphragm 93 and is adapted to contact with the strip 5 of sensitized material.

On the vacuum contact platen 91 at the corners thereof are outwardly extending plate members 97, with the plate members 97 on one end of the vacuum platen extending outwardly in opposite directions from the other plate members 97 on an opposite end of the platen. These plate members 97 have guides 98 slidably mounted on vertical uprights 99 of the frame 1, and the plate members 97 are fixedly mounted on the upper ends of vertically extending rods 100, 100', and 101, 101', pivotally mounted at their lower ends to the outer ends of arms 102, 102', 103 and 103' of bell cranks 104, 104', 105, and 105', respectively. The bell cranks 104 and 104' are fixedly mounted on a rocker shaft 106, which in turn is rotatably mounted in bearings 107 mounted on machine frame 1 and bell cranks 105 and 105' are mounted on stub shafts 108 and 108', rotatably mounted in bearings 109. The other arms 110 and 110' of the bell cranks 104 and 105, respectively, are pivotally connected together by a connecting bar 111. The other arms 112 and 112' of the bell cranks 104' and 105', respectively, are pivotally connected together by a connecting bar 113. The bell crank 105' has an additional arm 114 thereon in alinement with the arm 103' thereof and has a roller 115 on its outer end engaging a cam 116 fixedly mounted on the main shaft 55, which cam 116 is provided with a low part 117 and a high part 118 forming shoulders 116', whereby the cam 116 is adapted to ride from the low part 117 to the high part 118 or from the high part 118 to the low part 117 of the cam for automatically actuating the bell cranks and their connected mechanism in operating the platen 91 into engagement with the glass panel 3 of the negative carrier 2 and with the pad 96 on the diaphragm 93 of the platen adapted to contact with the negative 4, also for automatically actuating the platen 91 out of engagement with the panel 3. Springs 118' are connected to the bars 111 and 113 and to the machine frame 1 for normally maintaining the platen operating mechanism in its inoperative position.

Referring more particularly to Figs. 9 and 10, a stamping punch 119 is mounted on the platen 91, which punch 119, upon the actuation of the platen 91 into contact with the transparent plate 3 of negative carrier 2, causes a lever 119' on the punch to strike a stop 120 mounted on a bracket 121 of a counter 122 to actuate the punch through an opening 123 formed in the punch, for producing apertures in the strip 5 of sensitized material whereby an index is provided for cutting the photographic prints from the strip of sensitized material.

A conventional motor driven vacuum pump 124 is mounted on machine frame 1 and is connected by a conduit 125 in communication with a suitable lubricator 126 which in turn is connected by a conduit 127 to a relatively large vacuum tank or chamber 128. The vacuum pump 124 is also connected by a conduit 129 to an oil separator 130 which in turn is connected to an exhaust pipe 130'. The vacuum chamber 128 is connected in communication with an automatically operated valve 131 by means of a conduit 132 and from the valve 131 to the platen 91 through a conduit 133 and a flexible conduit 134 connected to a small conduit 135 mounted on the platen 91. The small conduit 135 extends through the diaphragm 93 to the space 95 between the strips 94 and pad 96, Fig. 8.

The valve 131 shown in detail in Figs. 11 and 12 is mounted on a plate 137 on machine frame 1 and comprises a T-shaped fitting 138 including a cylindrical portion 139 having a cylinder 140 fitted therein containing apertures 141 and 142 and connected at one end to the conduit 132 leading into the vacuum tank 128. The apertures 141 are so arranged on the cylinder 140 as to provide passages therethrough into the cylindrical portion 139 connected to the conduit 133 leading toward the platen 91, and the apertures 142 provide passages through the cylinder 140 to the atmosphere. Within the cylinder 140 is a piston or plunger 143 mounted on one end of a piston rod 144 having a roller 145 mounted on its outer end by a bolt 146, which roller 145 is held in contact with a cam 147 by a spring 148, which cam 147 is mounted on the main shaft 55. The spring 148 is connected at one end to the bolt 146 and at its other end to the machine frame 1 at 149. The piston rod 144 is slidably mounted in a bearing 150 provided on a bracket 151 mounted on the plate 137 and the cam 147 has a high portion 152 and a low portion 153, thereby forming shoulders 154 which are adapted to engage the roller 145 for causing the roller 145 to move from the low portion 153 to the high portion 152 and from the high portion 152 to the low portion 153 of cam 147 to reciprocate the piston 143 in the cylinder 140 by means of the connecting rod 144 for a purpose which will hereinafter be described. A gauge 155 having a hand 155' and a suitably graduated dial 156 thereon is connected to the vacuum chamber 128 by a conduit 157.

A switch operating disc or cam 158 is also fixedly mounted on the main shaft 55 and is provided with a fixed pin 159 and a movable pin 160 adjustably mounted in an arcuate slot 161 provided in the disc 158. A suitable graduated scale 162 is inscribed on the disc 158 along the slot 161, whereby the amount of adjustment of the movable pin 160 in the slot 161 away from and toward the fixed pin 159 may be determined for a purpose which will hereinafter appear. Upon rotation of the main shaft 55, pins 159 and 160 on disc 158 are adapted to actuate a master switch 163 for making and breaking a charged electric circuit illustrated in Fig. 15 to be hereinafter described.

The master switch 163 illustrated in detail in Figs. 13 and 14 preferably comprises a plate 164 mounted on a bracket 165 which in turn is suitably mounted to machine frame 1. On the plate 164 are bolts 166 and 166' having switch blades 167 and 167' mounted on one of their ends, and electric conductors 168 and 168' connected to the other ends of the bolts 166 and 166'. The switch blades 167 and 167' extend inwardly in opposed relation to each other and are provided with contact points 169 and 170, respectively. The bracket 165 provided with a pair of ears or bearing members 171 carrying a rotatably mounted shaft 172 having an elongated shaped cam 173 of suitable non-conductive material fixedly mounted on one end thereof and a hub 174 mounted on its other end, which hub 174 has a plurality of equally spaced radial pins 175 fixed thereon. A rectangularly shaped block member 176 is also mounted on shaft 172 between the bearing members 171 and is adapted to abut against a plate 177 provided with an inwardly extending pin 178 surrounded by a spring 179 adapted to force the plate 177 into contact with one side of the block member 176.

Referring more particularly to Fig. 15, the conductor 168' for the switch 163 is connected to one terminal 180 of a light switch 181 through the electric plugs 182 and 183. The light switch 181 is connected to a machine operating switch 184 by a conductor 185, which switch 184 is connected by a conductor 186 to the electric motor 86. The motor 86 is connected by a conductor 187 to one side of the plug 182 and the conductors 185 and 187 are connected to a suitable source of electric supply by conductors 188 and 188'. The conductor 168 is connected to a plurality of separate conductors 189 through the individual switches 11 to one side of lamps A with the other side of the lamps A being connected by conductors 190 to the conductor 168'. The motor driven vacuum pump 124 is connected to conductors 186 and 187 by conductors 191.

Figure 2:
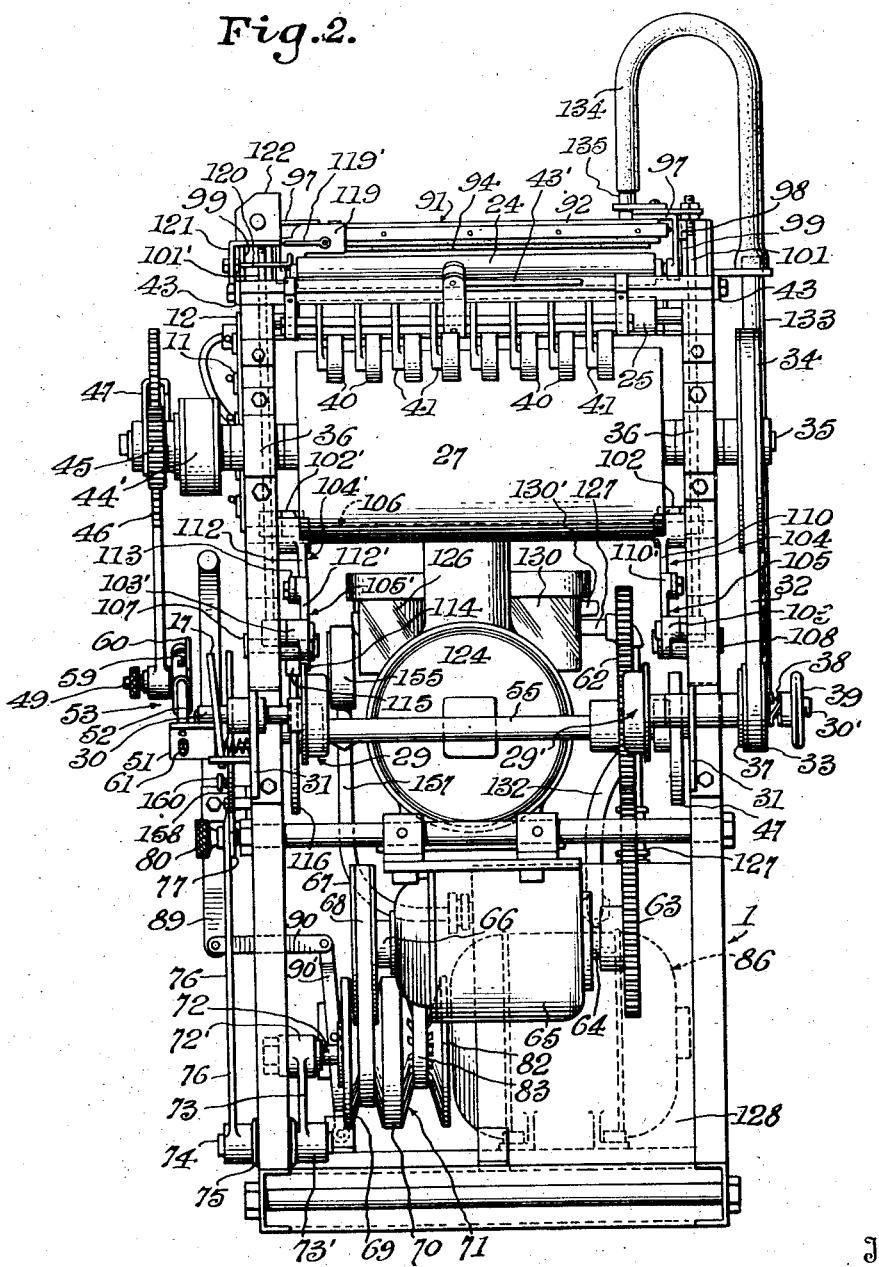
Fig. 2 is a front end view of the machine.
Figure 3:
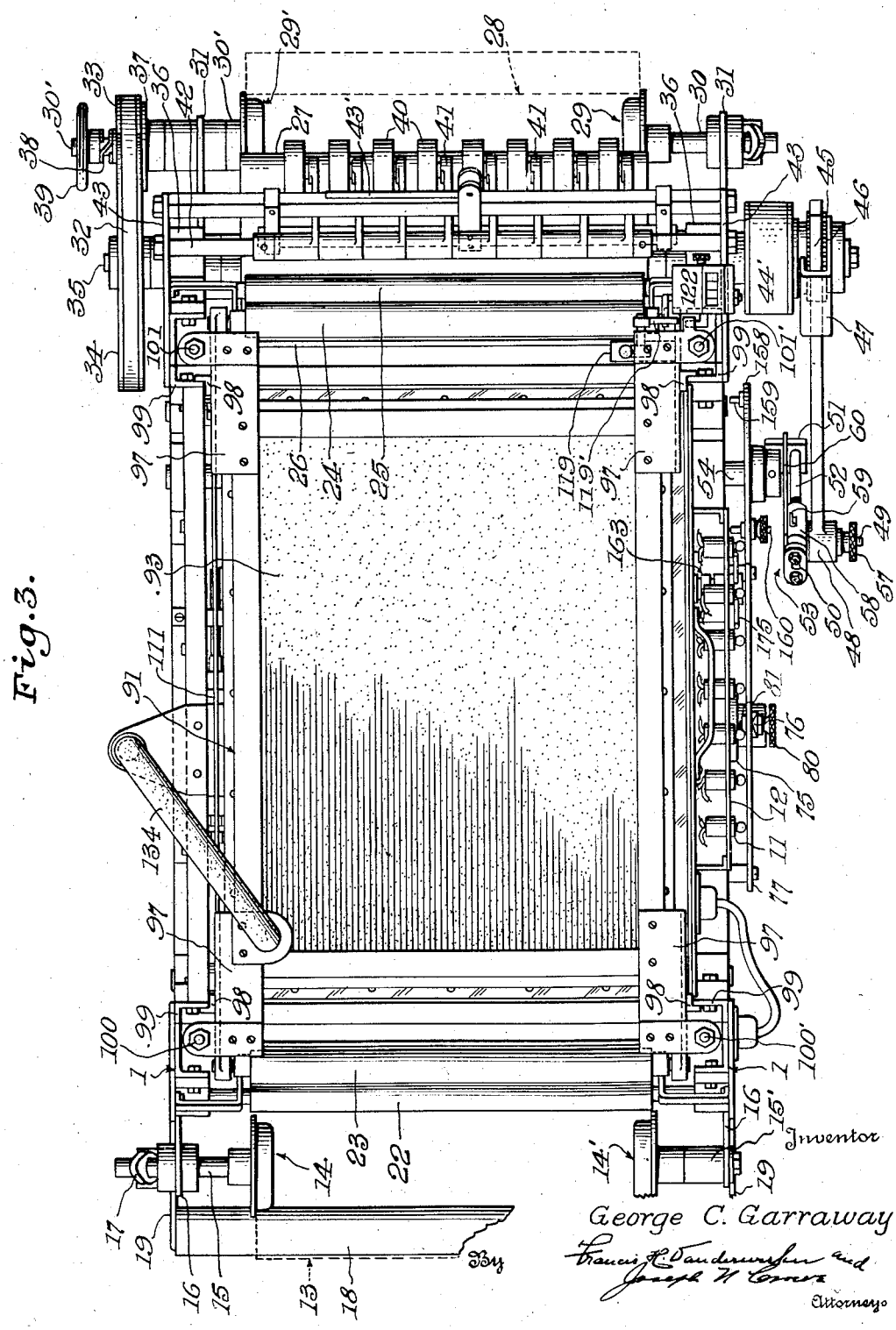
Fig. 3 is a top plan view thereof.
Figure 4:
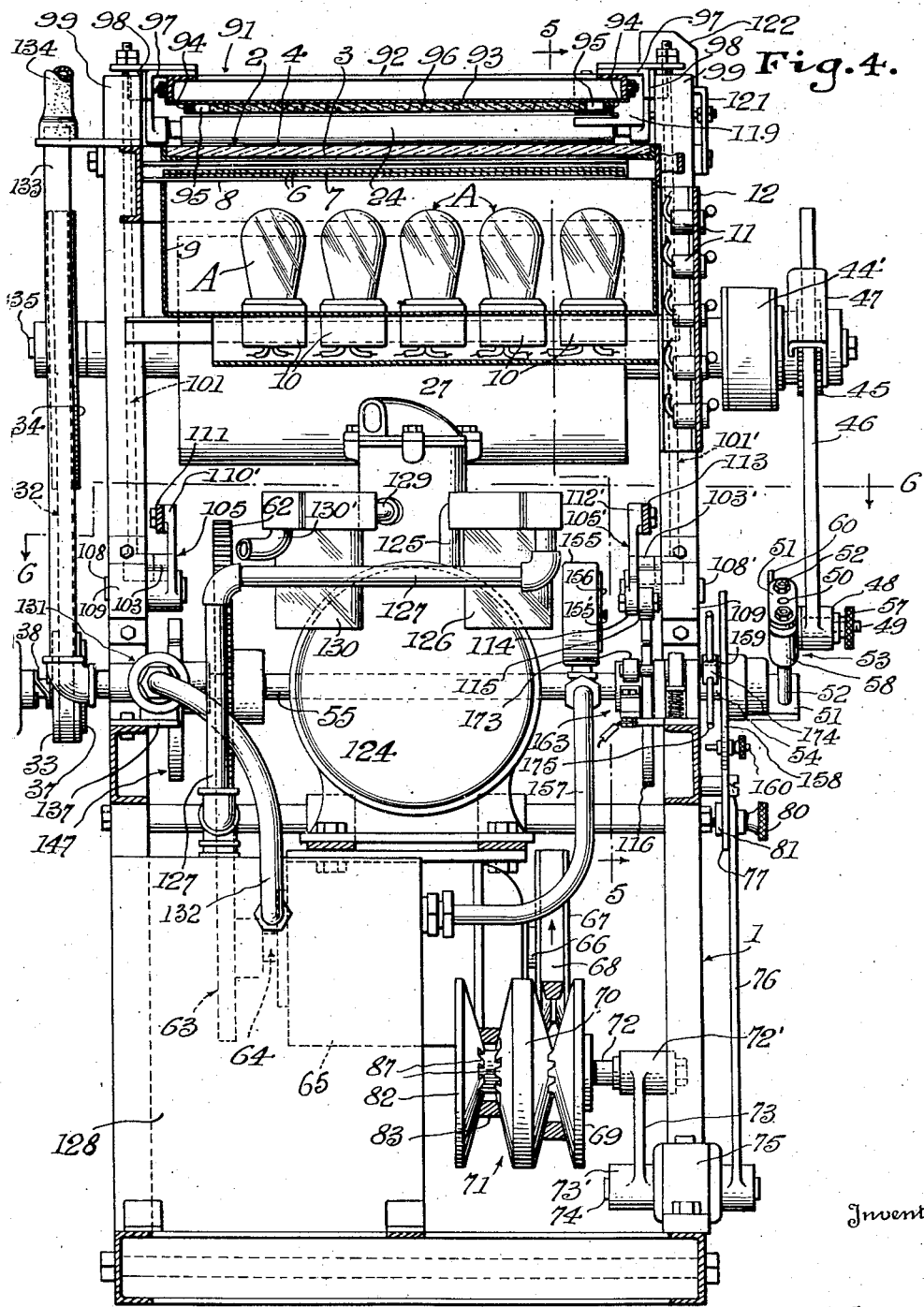
Fig. 4 is a transverse vertical sectional view taken on the line 4—4 of Fig. 1.
Figure 6:
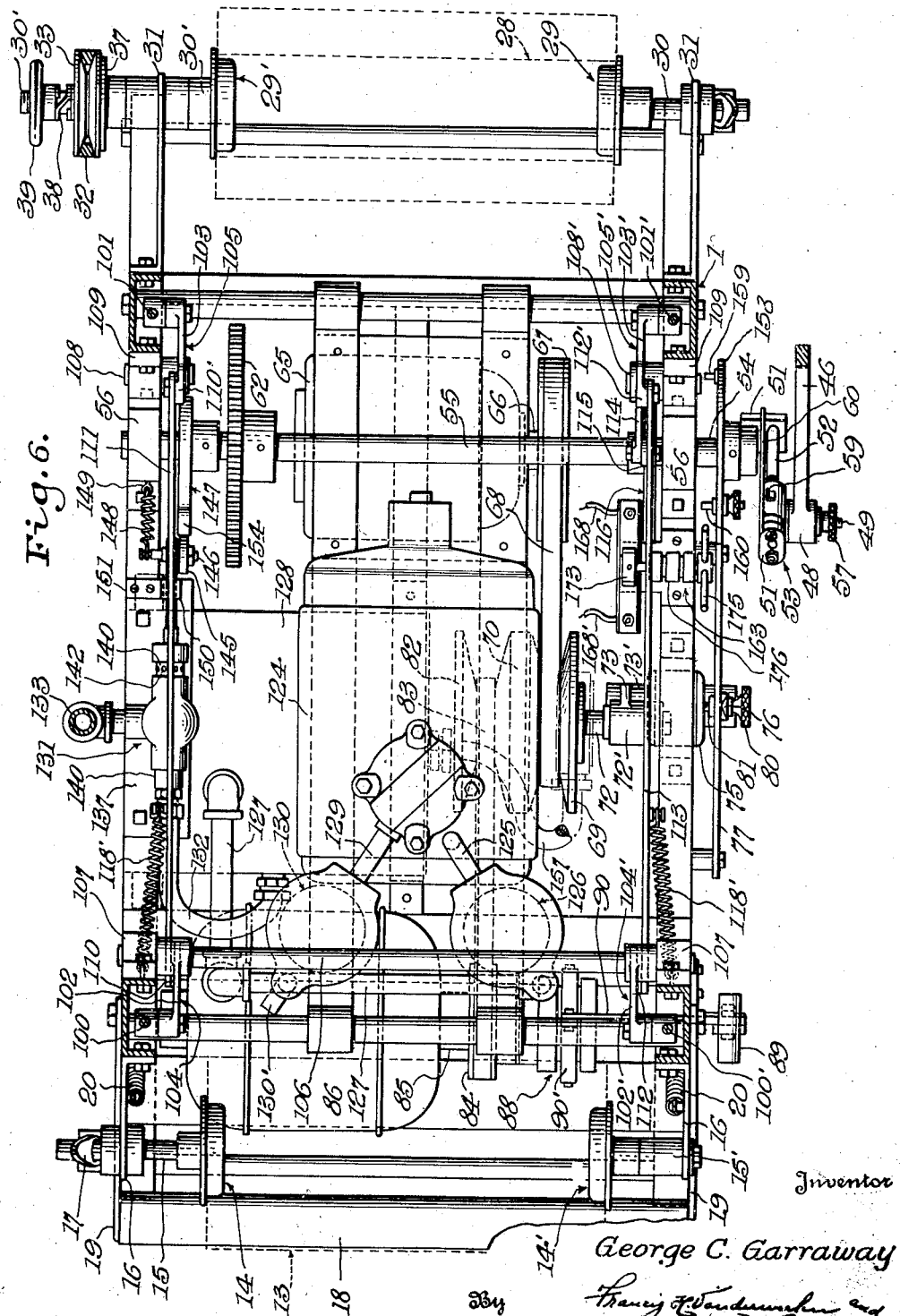
Fig. 6 is a horizontal sectional view taken on the line 6—6 of Fig. 4.

In automatically making photographic prints by the improved photographic printing machine, assuming that switch 184 has been closed, Fig. 15, a circuit is completed through the conductor 188 of the positive side of the electric circuit through part of the conductor 185, switch 184, conductor 186, through the motor 86, conductor 187, to the conductor 188' of the negative side of circuit, whereby the motor 86 is caused to rotate in a clockwise direction as indicated by the arrow and a circuit is completed through conductors 191 to vacuum pump 124 for starting the vacuum pump. The motor 86 drives the standard speed regulating device 71 by means of the belt 83, which engages pulley 84 on motor shaft 85 and also engages between movable pulley element 70 and fixed pulley element 82 on rod 72 of the speed regulating device 71, whereby input shaft 66 of the commercial speed reduction device 65 is driven in a clockwise direction as indicated by the arrow by means of belt 68, which engages pulley 67 on input shaft 66 of the speed reduction device 65 and also between the other side of movable pulley element 70 and fixed pulley element 69 of the speed regulating device 71, Figs. 2 and 6. Upon rotation of input shaft 66 of the speed reduction device 65, the output shaft 64 thereof is driven in a counter-clockwise direction, thereby driving the gear 63 in a counterclockwise direction as indicated by the arrow and rotating gear 62 in a clockwise direction, which in turn rotates main shaft 55 and cam 116 thereon in the same direction as gear 62.

Figure 5:
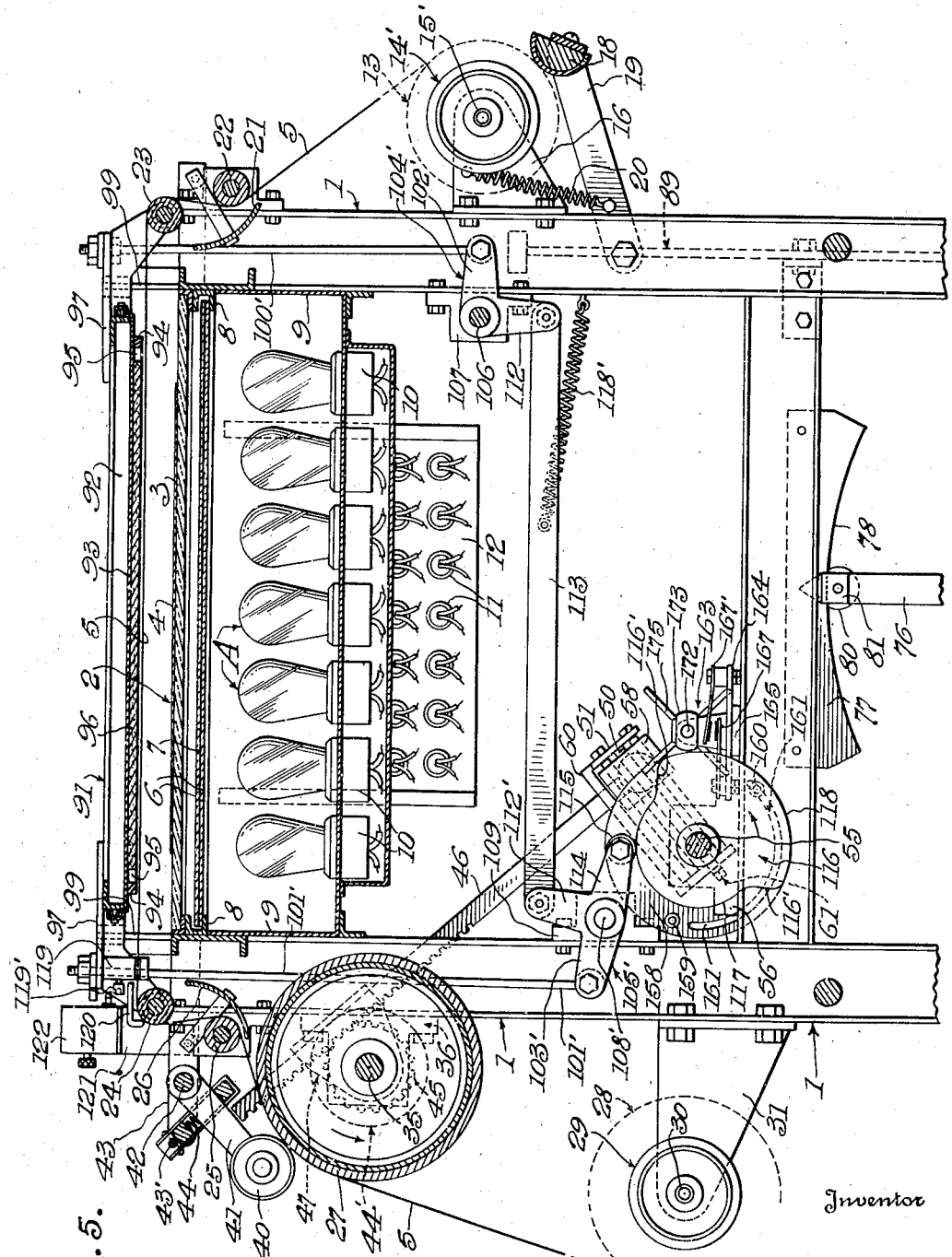
Fig. 5 is a vertical longitudinal sectional view taken on the line 5—5 of Fig. 4.

As cam 116 is rotated, the roller 115 on the arm 114 of bell crank 105' is caused to ride up on the high part 118 of the cam from the low part 117 by means of a shoulder 116', whereby bell crank 105' is rotated in a counter-clockwise direction, Fig. 5, thus rotating bell crank 104' in a clockwise direction through connecting bar 113, thus causing the arms 102' and 103' of the bell cranks 104' and 105' to pull downwardly on rods 100' and 101' connected at their upper ends to one side of the vacuum plates 91. Upon the rotation of bell cranks 104' and 105', the rocker shaft 106 is rotated in a clockwise direction thus rotating the bell crank 104 in the same direction, which in turn actuates the connecting bar 111 to move the bell crank 105 in a clockwise direction to pull downwardly on the rods 100 and 101, connected to the other side of the vacuum platen 91, whereupon the vacuum platen is pulled downwardly until the soft rubber strips 94 thereon contact with the transparent panel 3 of the negative carrier 2, with the pad 96 on the diaphragm 93 contacting with the portion of the strip 5 of sensitized material above the negative 4 on the transparent panel 3.

Upon the soft rubber strips 94 of vacuum platen 91 contacting with the transparent panel 3, the valve operating cam 147, Figs. 11 and 12, on main shaft 55 is moved sufficiently that roller 145 on the outer end of connecting rod 144 has been moved from the high part 152 of the cam whereby the spring 148 pulling outwardly on piston rod 144 of piston 143 causes roller 145 to ride down onto the low part 153 of cam 147 with the piston 143 being moved to an operative position where the vacuum chamber 128 is connected in communication through the valve 131 to the vacuum platen 91 and air is quickly withdrawn from between the diaphragm 93 and glass plate 3 and passes through pipe 135, flexible conduit 134, conduit 133, valve 131, conduit 132, to vacuum tank 128, with the space 95 between strips 94 and pad 96 providing a passage for permitting the air to pass freely therethrough, whereupon atmospheric pressure is caused to bear on diaphragm 93 for holding the strip 5 of sensitized material in perfect contact with the negative 4 on transparent panel 3. Upon the sensitized material being held in contact with the negative 4, the switch operating disc 158, fixed to main shaft 55, is rotated sufficiently to cause the adjustably mounted pin 160 to engage one of the radial pins 175 on the exposure electric switch 163, whereby shaft 172 is rotated a sufficient distance to cause switch cam 173 to engage with switch blade 167' and forcing the free end of the switch blade 167' inwardly until the contact point 170 thereon engages with contact point 169 on the free end of the switch blade 167. Assuming that light power switch 181 and individual switches 11 of the bank of lamps A have been closed, an electric circuit is thus completed from the conductor 188 of the positive side of the electric circuit through switch 181 to one side of the plug 182, to one side of the plug 183 to conductor 168' through switch 163, to conductor 168, through plugs 183 and 182 to conductor 187 to the negative side of the circuit, and from the conductor 168 through the individual conductors 189, individual switches 11, the bank of lamps A through the conductors 190 to the conductor 168'.

Upon energization of the lamps A the strip 5 of sensitized material is exposed to the negative 4 through transparent panel 3, thereby producing a print of the negative thereon. The individually connected switches 11 correspond in number to the number of lamps A in box 9 and are connected so any desired lamp may be extinguished, if desired, to reduce the amount of light under certain areas of the negative 4 whereby uneven densities of the negative may be compensated. The light retarding material 7 between the glass plates 6 is also adapted to compensate for uneven densities in the negative.

The correct exposure period for the strip of sensitized material to a certain negative may be determined by test or by measuring the density of the negative by means of a commercial light meter (not shown), which exposure period is controlled by adjusting the movable pin 160 in the arcuate slot 161 along the scale 162 on disc 158 either in a clockwise or counterclockwise direction away from or toward the fixed pin 159 for increasing or decreasing the exposure period, respectively. After the disc 158 has rotated sufficiently, the fixed pin 159 engages another of the radial pins 175 on the exposure electrode switch 163, whereby the shaft 172 is rotated a sufficient distance to cause the cam 173 to become disengaged from the switch blade 167', which blade 167' springs outwardly from engagement with the switch blade 167, thus breaking the circuit through conductors 168 and 168' to extinguish the lamps A.

After the lamps A have been extinguished, the main shaft 55 is rotated sufficiently to cause roller 145 in contact with valve operating cam 147 to ride up on the high part 152 thereof and moving piston 143 into the cylinder 140 of valve 131 whereby the vacuum tank 128 is cut off from the valve 131 and air is permitted to enter the apertures 142 in the cylinder 140 and to pass through the apertures 141 to conduits 133, 134 and pipe 135 where it enters vacuum platen 91, thus breaking the vacuum therein. After the air has entered vacuum piston 91, the cam 147 has been actuated to a position where roller 145 has ridden from the high part 152 of cam 147, whereupon the springs 118' pulling on bars 111 and 113 actuate bell cranks 104, 104', 105 and 105' in a direction to move the rods 100, 100', 101 and 101', respectively, for moving vacuum platen 91 upwardly from engagement with the strip of sensitized material. The crank 53 is so positioned on main shaft 55 that, after platen 91 has been raised, rack 46 is caused to move upwardly in mesh with gear 45, whereby feed roller shaft 35 is rotated in a clockwise direction through the conventional one-way or over-running clutch 44' to rotate the feed roller 27 in the same direction, whereby after each exposure the required amount of the strip 5 of sensitized material is drawn from the supply roll 13 and fed by the feed roller 27 toward rewind roller 28 rotated by belt 32 upon the actuation of the feed roller 27.

In order to print on sensitized material of different speeds or degrees of sensitivity or to print from negatives of varying density, it is desirable to be able to regulate the speed of the machine over a range as for example from 6 to 36 cycles per minute. This is accomplished by driving the standard speed regulating device 71 by the belt 83, driven by electric motor 86, while belt 68 drives speed reduction device 64 from speed regulating device 71 having gear 63 mounted on the output shaft 64 thereof, with the gear 63 meshing with gear 62 mounted on main shaft 55.

By moving the lever 76 toward motor pulley 84, that is to the left, above scale 79 on plate 77, the rod 72 having pulley elements 69, 70 and 82 thereon is moved to the left through shaft 74 and arm 73 of the speed regulating device 71, whereby the belt 83 from electric motor 86 engaging between movable pulley element 70 and pulley element 82 causes pulley element 70 to move over toward pulley element 69 and decreasing the space between pulley elements 69 and 70, thereby causing the machine to operate at a slower speed, and should the lever 76 be moved toward the speed reduction device 65, that is to the right along scale 79, the pulley elements 69, 70 and 82 are also moved toward the speed reduction device, whereby belt 68 causes the movable pulley element 70 to move along the rod 72 toward pulley element 82, thus decreasing the space between pulley elements 70 and 82 and increasing the space between pulley elements 69 and 70, thereby causing the photographic printing machine to run faster. The gear 62 on main shaft 55 meshing with gear 63 on output shaft 64 of speed reduction device 65, which gears 62 and 63 may be of the elliptical type if desired, are arranged in such a manner that the minor radius 192 of gear 63 is engaged with the major radius 193 of gear 62, thereby causing a relatively slower rotative speed of the main shaft 55 during an exposure period and the major radius 194 of gear 63 is engaged by the minor radius 195 of gear 62 in accelerating the operation of the machine to perform purely mechanical features thereof.

It will thus be seen that there is provided a novel and efficient form of photographic printing machine which is well adapted for all the purposes indicated. Even though there has been herein shown and described certain features of construction and operation of parts, it is nevertheless to be understood that various changes in construction may be made therein if the changes do not depart from the spirit or scope of the claims.

Having described my invention, what I claim as new and wish to secure by Letters Patent is:

1. In a photographic printing machine adapted to produce automatically a plurality of photographic prints of a negative on a strip of sensitized material, the combination of a support, a negative carrier removably mounted on the support and including a transparent panel adapted to support a negative, said strip of sensitized material disposed above the panel, means disposed about the strip of sensitized material and adapted to be actuated at predetermined time intervals for moving portions of the strip of sensitized material into contact with the negative, means disposed beneath the negative carrier and adapted to print the negative on the strip of sensitized material, said last-mentioned means including a plurality of electric lamps, an electric circuit connected to a source of potential and having connections with each of said lamps, a switch in each of said connections, a master switch connected to be actuated to open and close said electric circuit, means including a feed roller for moving the strip of sensitized material across the panel at predetermined time intervals, a shaft connected to drive said feed roller, means mounted on said shaft for actuating said master switch to close said electric circuit at predetermined time intervals for lighting the lamps to produce prints of the negative on the strip of sensitized material, and means for driving the shaft at different speeds during each cycle of operation of the machine for accelerating the action of said first and third-mentioned means and retarding the action of said fourth-mentioned means, said driving means including a gear eccentrically mounted on said shaft, speed reduction means, a gear eccentrically mounted on said speed reduction means and meshing with said first-mentioned gear, a speed regulating mechanism connected to drive said speed reduction means and an electric motor connected to drive said speed regulating mechanism.

2. In a photographic printing machine adapted to produce automatically a plurality of prints of a negative onto a strip of sensitized material, the combination of a support, a negative carrier removably mounted on the support and including a transparent panel adapted to support a negative, means adapted to contact the strip of sensitized material with the negative, means adapted to print the negative onto a surface of the strip of sensitized material, said last-mentioned means including a plurality of electric lamps, an electric circuit connected to a source of potential and having separate connections with each of said lamps, a switch in each of said connections, a master switch adapted to be actuated to close said electric circuit at predetermined time intervals, means including a feed roller for intermittingly moving the strip of sensitized material at predetermined time intervals across the negative, a shaft rotatably mounted on said support and connected to drive said feed roller, a disc fixedly mounted on said shaft and having pins provided thereon, one of said pins fixed to said disc and another of said pins adjustably mounted thereon, said pins on the disc adapted to actuate said master switch at predetermined time intervals for opening and closing said electrical circuit at predetermined time intervals and means for driving the shaft at different speeds during each cycle of operation of the machine for accelerating the action of said first and third-mentioned means and retarding the action of said disc in causing said pins to actuate said master switch, said driving means including a gear eccentrically mounted on said shaft, speed reduction means, a gear eccentrically mounted on said speed reduction means and meshing with said first-mentioned gear, a speed regulating mechanism connected to drive said speed reduction means and an electric motor connected to drive said speed regulating mechanism.

3. In a photographic printing machine adapted to produce automatically a plurality of photographic prints of a negative on a strip of sensitized material, the combination of a support, a transparent panel adapted to support a negative mounted on said support, said strip of sensitized material disposed above said panel, a vacuum platen disposed above said strip of sensitized material and mounted to be actuated upwardly and downwardly on said support, a diaphragm provided on said platen, means for actuating said platen downwardly to press a portion of the strip of sensitized material into engagement with the panel and to actuate said platen upwardly from the panel, means including a valve adapted to be automatically actuated at predetermined time intervals for creating a vacuum in said platen, whereby said diaphragm is forced downwardly by atmospheric pressure to press a portion of the strip of sensitized material against the negative, means for producing a print of the negative on the sensitized material, said last-mentioned means including a plurality of electric lamps, an electric circuit connected to a source of potential and having separate connections to each of said lamps, a switch controlling said electric circuit, means including a feed roller for intermittingly moving the strip of sensitized material at predetermined time intervals across the panel, a shaft rotatably mounted on the support and connected to drive said feed roller, means mounted on said shaft for automatically and intermittently actuating said switch for closing said circuit at predetermined time intervals for energizing said lamps, said valve adapted to be actuated for admitting air into said platen for breaking the vacuum, means mounted on said shaft for actuating said valve at predetermined time intervals and means for driving said shaft at different speeds during each cycle of operation of the machine for accelerating the action of said first, fourth and sixth-mentioned means and retarding the action of said fifth-mentioned means, said driving means including a gear eccentrically mounted on said shaft, speed reduction means, a gear eccentrically mounted on said speed reduction means, a speed regulating mechanism connected to drive said speed reduction means and an electric motor connected to drive said speed regulating mechanism.

4. In a photographic printing machine adapted to produce automatically a plurality of exposures on a strip of sensitized material, the combination of means including a plurality of electric lamps adapted to print an image on the strip of sensitized material, means connected to actuate said lamps at predetermined time intervals for printing the image on the strip of sensitized material, means including a feed roller for intermittingly moving the strip of sensitized material at predetermined time intervals across the image, a shaft connected to drive said feed roller, means mounted on said shaft for controlling the action of said second-mentioned means and means for driving said shaft at different speeds during each cycle of operation of the machine for accelerating the action of said third-mentioned means and retarding the action of said fourth-mentioned means, said driving means including a gear eccentrically mounted on said shaft, speed reduction means, a gear eccentrically mounted on said speed reduction means and meshing with said first-mentioned gear, a speed regulating mechanism connected to drive said speed reduction means and an electric motor connected to drive said speed regulating mechanism.

5. In a photographic printing machine adapted to produce automatically a plurality of photographic prints of a negative on a strip of sensitized material, the combination of a support, a negative carrier removably mounted on the support and including a transparent panel adapted to support a negative, means including a plurality of electric lamps adapted to print the negative on the strip of sensitized material supported by said panel, means connected to actuate said first-mentioned means at predetermined time intervals for lighting the lamps to produce prints of the negative on the strip of sensitized material, means including a feed roller for intermittingly moving the strip of sensitized material at predetermined time intervals across the negative, means mounted on said shaft for controlling the action of said second-mentioned means and means for driving said shaft at different speeds during each cycle of operation of the machine for accelerating the action of said third-mentioned means and retarding the action of said fourth-mentioned means, said driving means including a gear eccentrically mounted on said shaft, speed reduction means, a gear eccentrically mounted on said speed reduction means and meshing with said first-mentioned gear, a speed regulating mechanism connected to drive said speed reduction means and an electric motor connected to drive said speed regulating mechanism.

6. In a photographic printing machine adapted to produce automatically a plurality of photographic prints of a negative on a strip of sensitized material, the combination of a support, a negative carrier removably mounted on the support and including a transparent panel adapted to support a negative, means adapted to print the negative onto a strip of sensitized material, means connected to actuate said first-mentioned means at predetermined time intervals for producing prints of the negative on the strip of sensitized material, means for intermittently moving the strip of sensitized material at predetermined time intervals across the negative, said last-mentioned means including a feed roller, an overrunning clutch adapted to drive said feed roller, a rewind roller, means for winding the strip of sensitized material on said rewind roller, a shaft, a rack engaging said clutch and connected to be actuated by said shaft for driving said clutch, means mounted on said shaft for controlling the action of said second-mentioned means and means for driving said shaft at different speeds during each cycle of operation of the machine for accelerating the action of said third-mentioned means and retarding the action of said fifth-mentioned means, said driving means including a gear eccentrically mounted on said shaft, speed reduction means, a gear eccentrically mounted on said speed reduction means and meshing with said first-mentioned gear, a speed regulating mechanism connected to drive said speed reduction means and an electric motor connected to drive said speed regulating mechanism.

7. In a photographic printing machine adapted to produce automatically a plurality of photographic prints of a negative on a strip of sensitized material, the combination of a support, a transparent panel mounted on said support and adapted to support a negative, said strip of sensitized material disposed above said panel, a vacuum platen disposed above the strip of sensitized material and mounted to be actuated upwardly and downwardly on said support, a diaphragm provided on said platen, means for actuating said platen downwardly to press a portion of the strip of sensitized material into engagement with the panel, means adapted to create a vacuum within the platen, whereby said diaphragm is forced downwardly at atmospheric pressure to press the portions of the strip of sensitized material against the negative, means for printing the negative on the strip of sensitized material, means connected to actuate said third-mentioned means at predetermined time intervals for producing prints of the negative on the strip of sensitized material, means including a feed roller for intermittingly moving the strip of sensitized material at predetermined time intervals across said negative, a shaft connected to drive said feed roller, a plurality of means mounted on said shaft for controlling the action of said first, second and fourth-mentioned means and means for driving said shaft at different speeds during each cycle of operation of the machine for accelerating the action of said first, second and fifth-mentioned means and retarding the action of said fourth-mentioned means, said driving means including a gear eccentrically mounted on said shaft, speed reduction means, a gear eccentrically mounted on said speed reduction means and meshing with said first-mentioned gear, a speed regulating mechanism connected to drive said speed reduction means and an electric motor connected to drive said speed regulating mechanism.

GEORGE C. GARRAWAY.